United States Patent [19]

Latimer et al.

[11] 4,042,508

[45] Aug. 16, 1977

[54] FILTER HOLDING MEANS

[75] Inventors: Eugene E. Latimer, Wilmington; John B. Waggoner, Joliet, both of Ill.

[73] Assignee: Caterpillar Tractor Co., Peoria, Ill.

[21] Appl. No.: 719,004

[22] Filed: Aug. 30, 1976

[51] Int. Cl.² ............................................. E03B 11/00
[52] U.S. Cl. .................................... 210/172; 210/232
[58] Field of Search ............... 210/132, 172, 232, 323, 210/314, 335, 340, 345, 443, 446; 137/454.6

[56] References Cited

U.S. PATENT DOCUMENTS

| | | | |
|---|---|---|---|
| 2,220,706 | 11/1940 | Cantin | 210/132 |
| 2,811,218 | 10/1957 | Winslow | 210/172 X |
| 3,161,589 | 12/1964 | Burckhalter | 210/232 |
| 3,476,252 | 11/1969 | Kudlaty | 210/323 |
| 3,653,512 | 4/1972 | Brown | 210/232 |
| 3,750,888 | 8/1973 | Rinaldo | 210/172 |
| 3,883,430 | 5/1975 | Codo | 210/132 |
| 3,900,400 | 8/1975 | Whitfield | 210/323 T |
| 3,928,201 | 12/1975 | Junck et al. | 210/132 |
| 3,959,141 | 5/1976 | Johnson | 210/172 |

Primary Examiner—Theodore A. Granger
Attorney, Agent, or Firm—Phillips, Moore, Weissenberger, Lempio & Majestic

[57] ABSTRACT

The invention is concerned with an improvement in a hydraulic reservoir which comprises a tank having internally thereof filter means attached longitudinally between a first and a second generally parallel side thereof, said filter means including generally tubular filter element means extending generally longitudinally between said first and second side of said tank and means for introducing a hydraulic fluid from an exterior of said tank to an interior of said element means from adjacent said first side of said tank. The improvement comprises a tube within said tank surrounding said element means and extending longitudinally generally the length thereof, said tube including exit means therethrough through which said hydraulic fluid passes after passage thereof from the interior to an exterior of said element means, a first end of said tube sealing adjacent said second side of said tank and a second end of said tube sealing adjacent said first side of said tank. Also part of the improvement is an opening through the second side of the tank to an interior of the tube adjacent the first end thereof sized to allow entry of the element means to the interior of the tube. Cover means are provided sealingly attachable over the opening and attachable longitudinally through the tube to adjacent the first side of the tank. Extending means extend from the cover means toward the first side of the tank within the tube. Compressible spring means supported by the extending means compress the element means toward adjacent the first side of the tank. Means are also provided for preventing the spring means from sliding away from the extending means.

5 Claims, 3 Drawing Figures

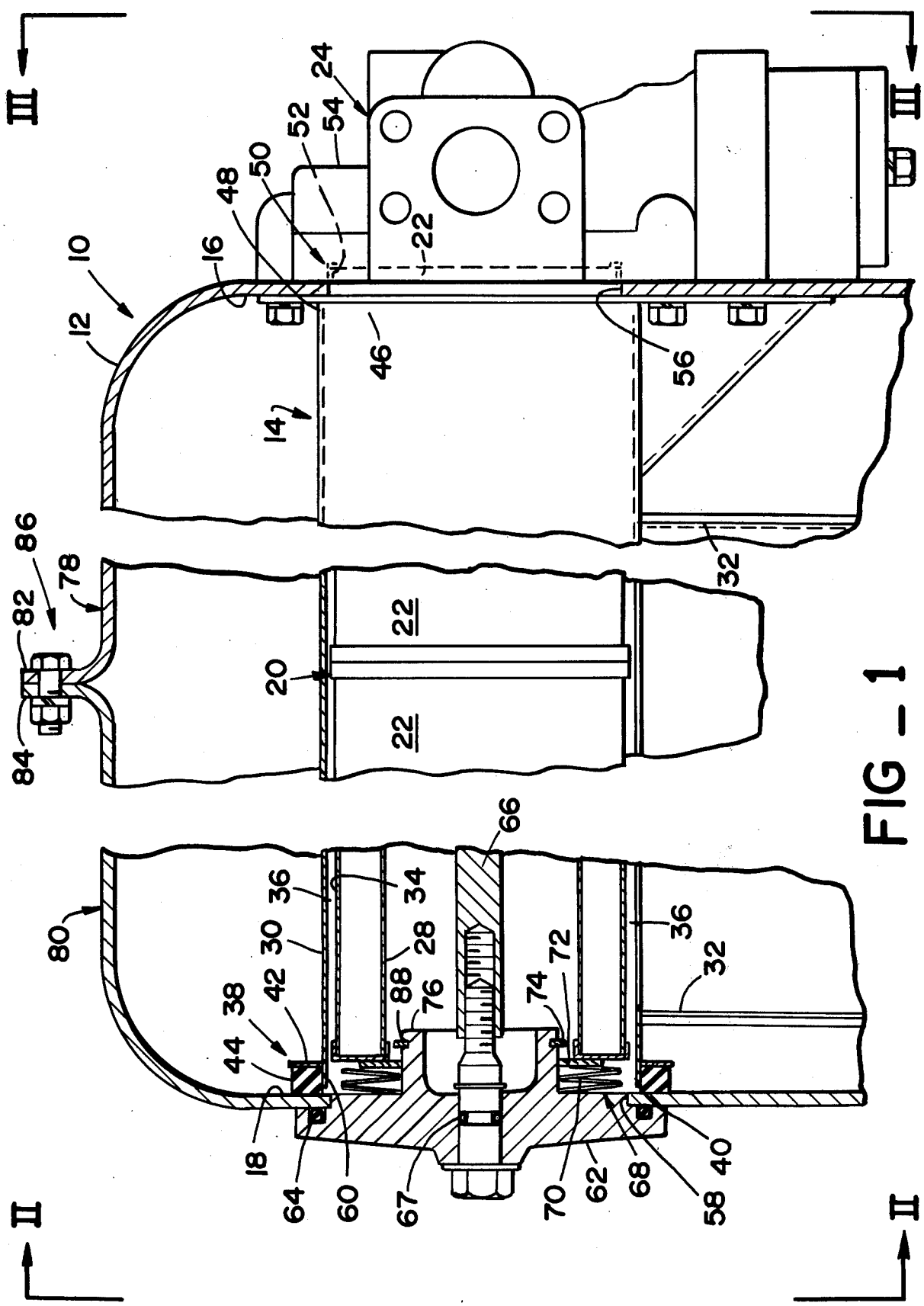

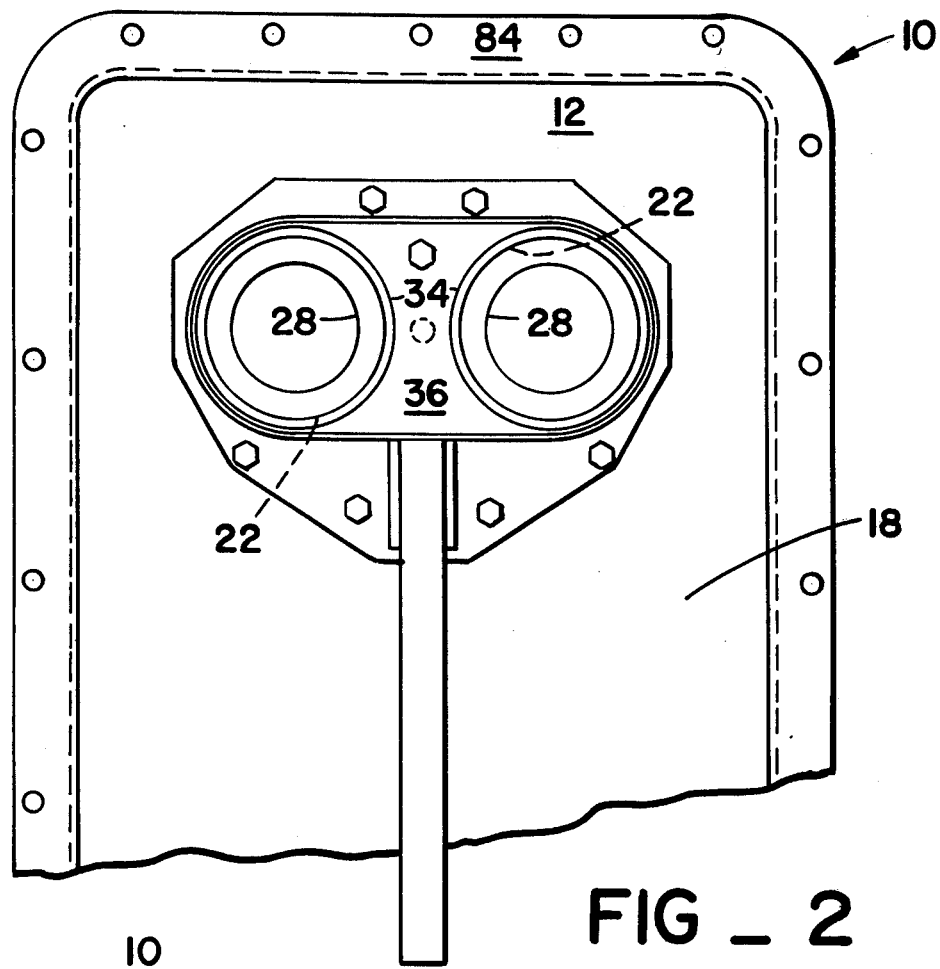
FIG_2
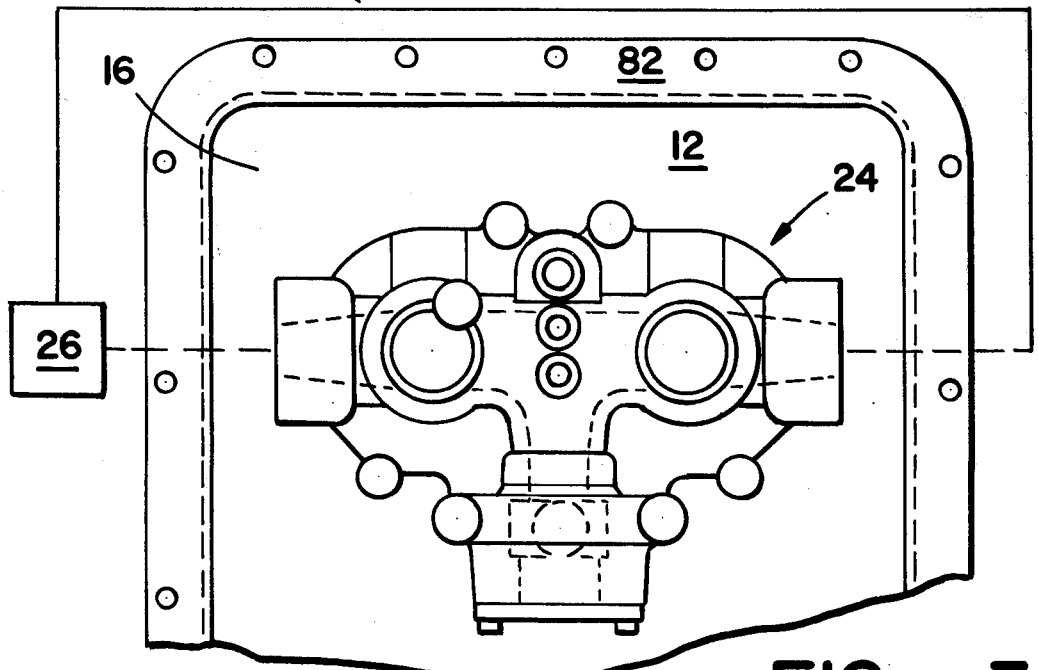
FIG_3

4,042,508

FILTER HOLDING MEANS

BACKGROUND OF THE INVENTION

1. Field of the Invention

The invention is concerned with filtering arrangements within hydraulic reservoirs and particularly with an improved hydraulic reservoir using a particular filtering arrangement therewithin. Still more particularly the invention is concerned with particular means for holding filter elements within particular filter means which is located within a hydraulic reservoir.

2. Prior Art

The prior art as illustrated for example by the teachings of U.S. Pat. No. 3,685,658 generally teaches external spin or thread-on type filters which are mounted externally of hydraulic reservoirs and other apparatus. While such filters have advantages in many applications there are also a number of applications wherein it is more desirable to have the filter means within a hydraulic reservoir whereby dirty hydraulic fluid which is returned to the reservoir must pass through the filter means and thereby be cleaned and pass back into the reservoir from whence it may be pumped back to a hydraulic system. Some filter elements are also used within hydraulic reservoirs such as those disclosed in, for example, U.S. Pat. No. 3,886,072 and 3,900,400 but these are for considerably different structure, operation and mounting than are the structures of the present invention.

When one desires to replace filter means within a reservoir several problems are encountered which are not generally encountered with externally mounted filter means. For example, a particular problem which encountered is that adaquate means must be provided for fastening the elements of the filter means in place whereby generally all of the hydraulic fluid which enters the filter elements must pass through them before returning to the reservoir. Further, means must be provided which allow for the easy removal and replacement of the filter elements as they become dirtied. The present invention provides an improved hydraulic reservoir internal filter means improvement which has the aforementioned attributes. Other advantages of the improvement of the present invention will be apparent from reading the description which follows.

SUMMARY OF THE INVENTION

The invention is concerned with an improvement in a hydraulic reservior which comprises a tank having internally thereof filter means attached longitudinally from a second towards a first generally parallel side thereof, said filter means including generally tubular filter element means. The improvement of the invention comprises an opening through the second side of the tank sized to allow entry of said element means to the interior of said tank. Cover means are provided sealingly attachable over said opening and attachable longitudinally through said element means to adjacent the first side of the tank. Extension means are provided extending from the cover means towards the first side of the tank within the element means. Compressible spring means are provided supported by the extension means and radially thereabout compressing the element means towards adjacent the first side of the tank. Means are also provided for preventing the spring means from sliding away from the extension means.

BRIEF DESCRIPTION OF THE DRAWINGS

The invention will be better understood by reference to the figures of the drawings wherein like numbers denote like parts throughout and wherein:

FIG. 1 comprises a partial side section view of a hydraulic reservoir including the improvement of the present invention;

FIG. 2 comprises a view taken along the line II-II of FIG. 1; and

FIG. 3 comprises a view taken along the line III-III of FIG. 1.

DETAILED DESCRIPTION OF THE PREFERRED EMBODIMENT

Turning first to FIG. 1 there is illustrated therein a hydraulic reservoir 10 which comprises a tank 12 having internally thereof filter means 14 attached longitudinally between a first side 16 and a second generally parallel side 18 of the tank 12. The filter means 14 includes generally tubular filter element means 20 which in the particular embodiment illustrated comprises four filter elements 22 which are shown most clearly in FIGS. 1 and 2. Hydraulic fluid introducing means 24 shown most clearly in FIG. 1 and 3 provide means for introducing a hydraulic fluid from an exterior of the tank, generally from a hydraulic system 26 illustrated schematically in FIG. 3 to an interior 28 of the filter element means 20 adjacent the first side 16 of the tank 12.

The invention is particularly concerned with a tube 30 within the tank 12 which surrounds the filter element means 20 and extends longitudinally generally the length of said filter element means 20. The tube 30 includes exit means 32 therefrom generally from the bottom thereof through which the hydraulic fluid passes after passage of the hydraulic fluid from the interior 28 of the filter element means 20 to an exterior 34 of the filter element means 20. More particularly, the exit means 32 leads from a chamber 36 formed between the filter element means 20 and the tube 30 generally to the inside of the hydraulic reservoir 10.

The tube 30 is compressibly sealed by compressible sealing means 38 in such a manner that a first end 40 of the tube 30 is held adjacent the second side 18 of the tank 12. The compressible sealing means of the present invention preferably comprises a flange 42 which extends peripherally outwardly from the tube 30 adjacent the first end 40 thereof and a compressible elastomeric gasket 44 which is compressed between the flange 42 and the second side 18 of the tank 12.

The improvement of the present invention preferably includes rigid attaching means 46 for rigidly attaching a second end 48 of the tube 30 adjacent the first side 16 of the tank 12. Holding means 50 for the filter element means 20 also preferably form a part of the improvement of the present invention. The holding means can simply comprise a pilot 52 in a port closure means 54 which covers a port 56 in the first side 16 of the tank 12. Two of the four filter elements 22, one of which is shown in FIG. 1, are thus rigidly held by the pilot 52.

An opening 58 through the second side 18 of the tank 12 provides access to an interior 60 of the tube 30 adjacent the first end 40 thereof. The opening 58 is sized to allow entry of the filter element means 20 and more particularly of the four filter elements 22 to the interior 60 of the tube 30. Cover means 62 is provided which is sealingly attachable, as for example by using a seal ring 64, over the opening 58. The cover means 62 is attachable longitudinally through the tube 30 adjacent the first side 16 of the tank 12 and more specifically is attachable to the port closure means 54 as by being screwed into the port closure means 54 via an elongated bolt means 66. The bolt means 66 pass through the cover means 62 and are sealed thereto by a seal ring 67. Compressible positioning means 68, in the embodiment illustrated a plurality of axially compressible resilient washer 70 which appear against a retaining washer 72 serve to compressibly hold the filter element means 20 between the first side 16 and the second side 18 of the tank 12. A retaining ring 74 generally serves to hold the plurality of resilient washers 70 and the retaining washer 72 from escaping from an extension 76 which extends from the cover 62 towards the first side 16 of the tank 12.

The tank 12 of the preferred embodiment includes means for disassembling it into a first part 78 which includes the first side 16 as part thereof and a second part 80 which includes the second side 18 of the tank 12 as a part thereof. The disassembling means for the tank generally includes the pair of flanges 82 and 84 extending respectively from the first part 78 and the second part 80 of the tank 12 and a plurality of bolt-nut means 86 fastening the first flange 82 to the second flange 84. Because of this disassembleability of the tank 12 the tube 30 can be readily placed therewithin and the port closure means 54 can be attached from the interior of the tank 12 when the first part 78 thereof is separated from the second part 80 thereof. After the tube 30 has been attached to the first part 78 and more particularly to the first side 16 of the tank 12 the gasket 44 can be put in place adjacent the flange 42 and the bolt-nut means 86 can be fastened in place. The filter element means 20 can be put in place either when the tank 12 is disassembled into the first part 78 and the second part 80 thereof or can be put in place through the opening 58 before or after removal of the cover 62.

As will be apparent more particularly from examination of FIG. 1, the improvement of the present invention is particularly concerned with the compressible positioning means 68. In the compressible positioning means 68, resilient washer means, namely the plurality of axially compressible resilient washers 70 provide a spring biasing against the retaining washer 72 for holding the four filter elements 22 relatively rigidly in place between the first side 16 of the tank 12 and the second side 18 thereof. More particularly, the compressible positioning means 68 holds the four filter elements 22 between the cover 62 and the port closure means 64. Further, through simple removal of the elongated bolt means 66 the cover 62 can be removed thereby releasing the pressure upon the four filter elements 22 whereby they can be removed via the opening 58. The retaining ring 74 will generally be of a conventional type that can be stretched about the extension 76 and placed within a groove 88 therein. Because of the presence of the retaining ring 74 it is possible to remove the cover 62 while the plurality of resilient washers 70 and the retaining washer 72 are kept on the extension 76 thus making assembly and disassembly of the entire filter means 14 relatively easy and quick.

While the invention has been described in connection with specific embodiment thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

What is claimed is:

1. In a hydraulic reservoir which comprises a tank having internally thereof filter means attached longitudinally between a first and a second generally parallel side thereof, said filter means including generally tubular filter element means extending generally longitudinally between said first and second side of said tank and means for introducing a hydraulic fluid from an exterior of said tank to an interior of said element means from adjacent said first side of said tank, an improvement comprising:

a tube within said tank surrounding said element means and extending longitudinally generally the length thereof, said tube including exit means therethrough through which said hydraulic fluid passes into said reservoir after passage thereof from the interior to an exterior of said element means, a first end of said tube sealing adjacent said second side of said tank and a second end of said tube sealing adjacent said first side of said tank;

an opening through said second side of said tank to an interior of said tube adjacent said first end thereof, said opening being sized to allow entry of said element means to the interior of said tube;

cover means sealingly attachable over said opening by rod means attached longitudinally through said tube to said first side of said tank;

a collar generally coaxially surrounding said rod means and extending from said cover means towards said first side of said tank within said tube;

compressible spring means surrounding said collar and compressing said element means towards said first side of said tank; and retaining means for holding said spring means on said collar.

2. An improvement as in claim 1, wherein said spring means comprises axially compressible resilient washer means about said collar and said retaining means comprises a retaining washer about said collar intermediate said resilient washer means and said element means.

3. An improvement as in claim 2, wherein said cover means comprises a cover and said rod means comprises bolt means passing sealingly therethrough, said bolt means passing through said tube and through said element means and being attached to said first side of said tank.

4. An improvement as in claim 3, wherein said retaining means further comprises a retaining ring fitting within a groove in said collar, said retaining ring extending peripherally outwardly from said groove about said collar further removed from said cover than is said retaining washer.

5. An improvement as in claim 4, wherein said resilient washer means comprises a plurality of axially compressible resilient washers.

* * * * *